US012775326B2

(12) United States Patent
Krishnan et al.

(10) Patent No.: US 12,775,326 B2
(45) Date of Patent: Oct. 27, 2026

(54) SYSTEMS AND METHODS FOR DYNAMICALLY MODIFYING EXTENDED REALITY ENVIRONMENTS AND DETERMINING MODIFIED USAGES IN REAL TIME USING QUANTUM COMPUTING

(71) Applicant: BANK OF AMERICA CORPORATION, Charlotte, NC (US)

(72) Inventors: Subburathinam Krishnan, Chennai (IN); Krithika Viswanathan, Chennai (IN); Amit Mishra, Chennai (IN); Durga Prasad Kutthumolu, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/627,746

(22) Filed: Apr. 5, 2024

(65) Prior Publication Data

US 2025/0315099 A1 Oct. 9, 2025

(51) Int. Cl.
*G06F 3/01* (2006.01)

(52) U.S. Cl.
CPC .................................... *G06F 3/011* (2013.01)

(58) Field of Classification Search
CPC .... G06F 3/04842; G06F 3/0486; G06F 3/011; G06F 3/165; G06F 3/0485; G06F 3/167; G06F 1/163; G06F 1/3231; G06F 3/017; G06F 1/1686; G06F 3/0482; G06F 40/169; G06F 1/3265; G06F 3/1423; G06F 3/04815; G06F 3/04845; G06F 3/013;
(Continued)

(56) References Cited

U.S. PATENT DOCUMENTS 10,767,997 B1 9/2020 Gorur Sheshagiri
10,901,606 B2 1/2021 Kies
(Continued)

FOREIGN PATENT DOCUMENTS

AU 2021214781 A1 9/2022
EP 3906883 A2 11/2021
(Continued)

*Primary Examiner* — Sarvesh J Nadkarni
(74) *Attorney, Agent, or Firm* — Moore & Van Allen PLLC; Lauren M. Stokes

(57) ABSTRACT

Systems, computer program products, and methods are described herein for dynamically modifying extended reality environments and determining modified usages in real time using quantum computing. The present disclosure is configured to identify an extended reality session comprising an extended reality interaction(s) by a user; determine, based on the extended reality interaction(s), a user intent for the extended session, wherein the user intent comprises an intended dimensional view of the extended reality session; dynamically, using a central usage measurement system comprising a quantum computing component, partition the extended reality session based on the user intent into a dimensional view(s); automatically track the dimensional view(s) for the extended reality session based on the extended reality interaction(s); and determine an overall consumption value for the extended reality session based on the dimensional view(s).

20 Claims, 9 Drawing Sheets

(58) Field of Classification Search
CPC ...... G06F 3/0231; G06F 1/1694; G06F 3/012; G06F 3/1454; G06F 2203/04803; G06F 2203/04806; G06T 7/70; G06T 11/60; G06T 19/00; G06T 19/006; G06T 7/73; G06T 19/20; G06T 2219/2004; G10L 15/22; G10L 2015/223; G02B 27/0172; G02B 2027/014; G02B 2027/0178; G02B 2027/0143; H04S 7/304; H04S 2400/11; G06V 10/761; G06V 20/20; G06V 40/28; G06V 40/20; G06V 40/10; G09G 3/001; G09G 2354/00; G09G 2330/021; G09G 2320/064; G09G 2320/0686; G09G 2320/0613; G08B 7/00
See application file for complete search history.

(56) References Cited

U.S. PATENT DOCUMENTS

| | | | | |
|---|---|---|---|---|
| 11,232,580 | B2 | 1/2022 | Tran | |
| 11,295,483 | B1 * | 4/2022 | Krishnamoorthy | G06V 20/20 |
| 11,354,899 | B2 | 6/2022 | Tang | |
| 11,410,403 | B1 | 8/2022 | Bhushan | |
| 11,475,650 | B2 | 10/2022 | Berliner | |
| 11,727,625 | B2 | 8/2023 | Gorur Sheshagiri | |
| 11,816,256 | B2 | 11/2023 | Peleg | |
| 11,822,597 | B2 | 11/2023 | Chor | |
| 11,887,262 | B2 | 1/2024 | Tavakoli | |
| 11,927,986 | B2 | 3/2024 | Berliner | |
| 11,954,258 | B1 * | 4/2024 | Agrawal | G06F 3/016 |
| 2019/0394282 | A1 * | 12/2019 | Hodge | H04L 67/306 |
| 2021/0085220 | A1 | 3/2021 | Poltaretskyi | |
| 2021/0133929 | A1 * | 5/2021 | Ackerson | G06F 3/04815 |
| 2022/0019470 | A1 * | 1/2022 | Jia | G06T 11/00 |
| 2022/0028356 | A1 * | 1/2022 | Grant | G09G 5/36 |
| 2022/0122005 | A1 * | 4/2022 | Li | G06F 3/017 |
| 2023/0016490 | A1 | 1/2023 | Berkebile | |
| 2023/0033743 | A1 | 2/2023 | Kumar | |
| 2023/0072423 | A1 | 3/2023 | Osborn | |
| 2023/0123933 | A1 * | 4/2023 | Smith | A63F 13/217 345/419 |
| 2023/0135787 | A1 * | 5/2023 | Peleg | G06F 3/03545 |
| 2023/0152851 | A1 * | 5/2023 | Berliner | G06F 1/163 361/679.41 |
| 2024/0048622 | A1 | 2/2024 | Berliner | |
| 2024/0257434 | A1 * | 8/2024 | Ökvist | A63F 13/52 |
| 2025/0308399 | A1 * | 10/2025 | Ruelas Ibarra | G06F 3/011 |

FOREIGN PATENT DOCUMENTS

| | | | |
|---|---|---|---|
| KR | 102619607 | B1 | 12/2023 |
| WO | 2021033820 | A1 | 2/2021 |

* cited by examiner

700

SYSTEMS AND METHODS FOR DYNAMICALLY MODIFYING EXTENDED REALITY ENVIRONMENTS AND DETERMINING MODIFIED USAGES IN REAL TIME USING QUANTUM COMPUTING

TECHNOLOGICAL FIELD

Example embodiments of the present disclosure relate to dynamically modifying extended reality environments and determining modified usages in real time using quantum computing.

BACKGROUND

Issues often arise in extended reality (XR) environments—such as an extended reality environment comprising artificial reality, virtual reality, mixed reality, and/or the like—in accurately partitioning each dimension within the extended reality environment and tracking user consumption. Such issues are further exacerbated in native devices where the virtual reality sessions are coupled with the native devices, making all the virtual reality experiences a mandate without an individual gate check. Thus, a system is needed that can accurately, efficiently, and securely partition dimensions within an extended reality session and can accurately, efficiently, securely, and dynamically track each dimension interaction.

Applicant has identified a number of deficiencies and problems associated with modifying and tracking extended reality sessions and modified usages. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for dynamically modifying extended reality environments and determining modified usages in real time using quantum computing.

In one aspect, a system for dynamically modifying extended reality environments and determining modified usages in real time using quantum computing is provided. In some embodiments, the system may comprise: a processing device; a non-transitory storage device containing instructions when executed by the processing device, causes the processing device to perform the steps of: identify an extended reality session comprising an at least one extended reality interaction by a user; determine, based on the at least one extended reality interaction, a user intent for the extended session, wherein the user intent comprises an intended dimensional view of the extended reality session; dynamically, using a central usage measurement system comprising a quantum computing component, partition the extended reality session based on the user intent into at least one dimensional view; automatically track the at least one dimensional view for the extended reality session based on the at least one extended reality interaction; and determine an overall consumption value for the extended reality session based on the at least one dimensional view.

In some embodiments, the automatic tracking of the at least one dimensional view comprises tracking the at least one dimensional view at a current time and at least one dimensional view at a future time within the extended reality session.

In some embodiments, executing the computer-readable code is configured to cause the at least one processing device to determine, based on the overall consumption value for the extended reality session based on the at least one dimensional view, an estimate for the extended reality session. In some embodiments, executing the computer-readable code is configured to cause the at least one processing device to: identify a mobile resource account associated with a user account of the extended reality session; determine a current resource available for the mobile resource account; compare the current resource available to the estimate for the extended realty session; and auto deduct, from the mobile resource account, the estimate for the extended reality session in an instance where the estimate meets or is less than the current resource available.

In some embodiments, the overall consumption value is associated with a computing component consumption further comprising at least one of a power consumption, a memory storage consumption, or a computer processing unit usage.

In some embodiments, the at least one dimensional view comprises at least one of a two-dimensional view, a three-dimensional view, a four-dimensional view, an auditory sound, an image, a video, or a tactile view.

In some embodiments, executing the computer-readable code is configured to cause the at least one processing device to: identify whether the extended reality session comprises an incognito mode attribute; and in an instance where the extended reality session comprises the incognito mode attribute, dynamically partition the extended reality session and determine the overall consumption value for the extended reality session comprising the incognito mode attribute.

In some embodiments, executing the computer-readable code is configured to cause the at least one processing device to: analyze, by a resolution scale model, at least one resolution for the at least one dimensional view of the extended reality session; and determine the overall consumption value for the extended reality session based on the at least one resolution for the at least one dimensional view. In some embodiments, the at least one resolution is pre-determined based on a user preference, and wherein the user preference automatically retains the at least one resolution, increases the at least one resolution, or decreases the at least one resolution. In some embodiments, the user preference is dynamically updated based on a trained artificial neural network (ANN) model, and wherein the user preference updated by the ANN model is missing or unknown.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
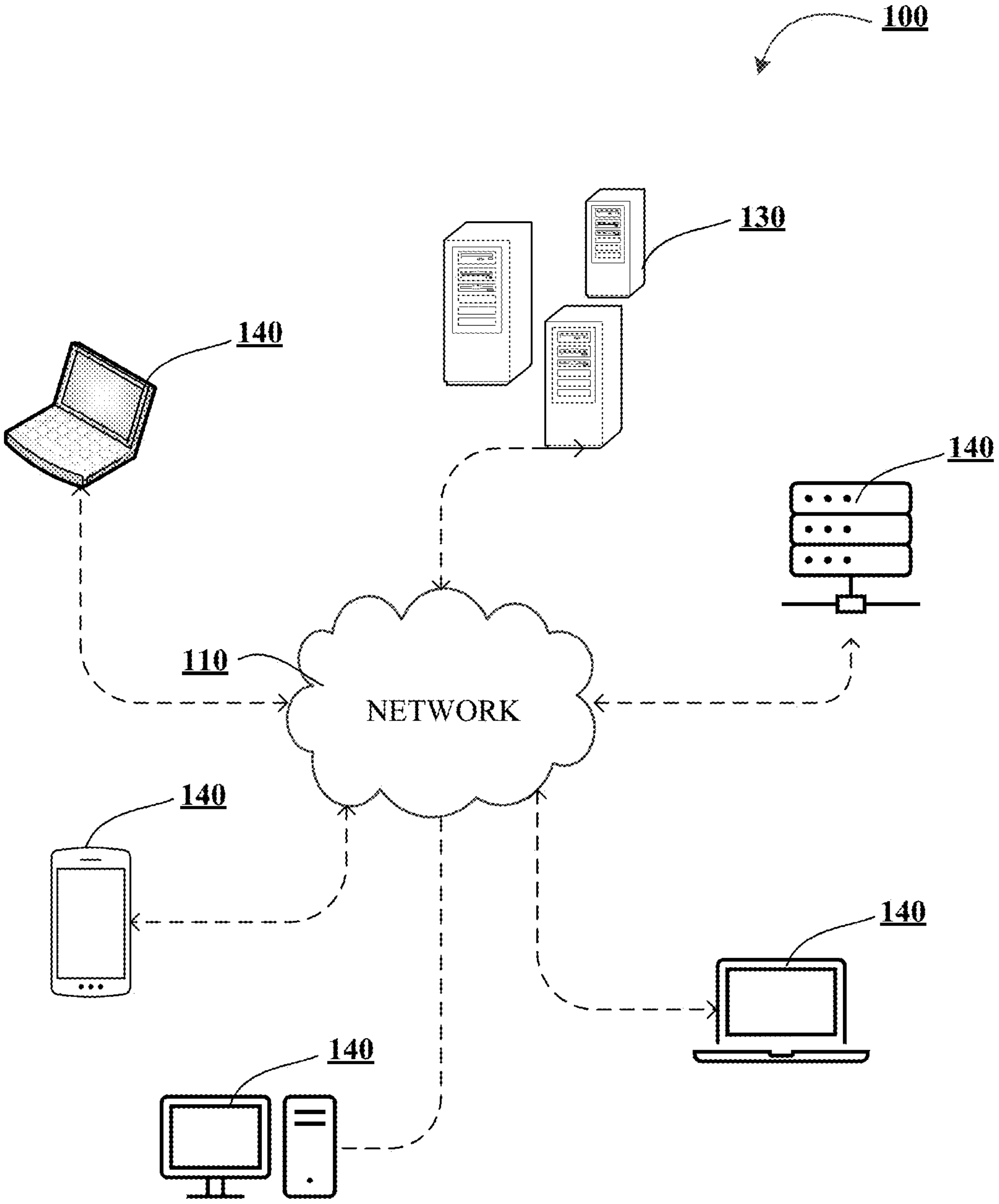
Figure 1B:
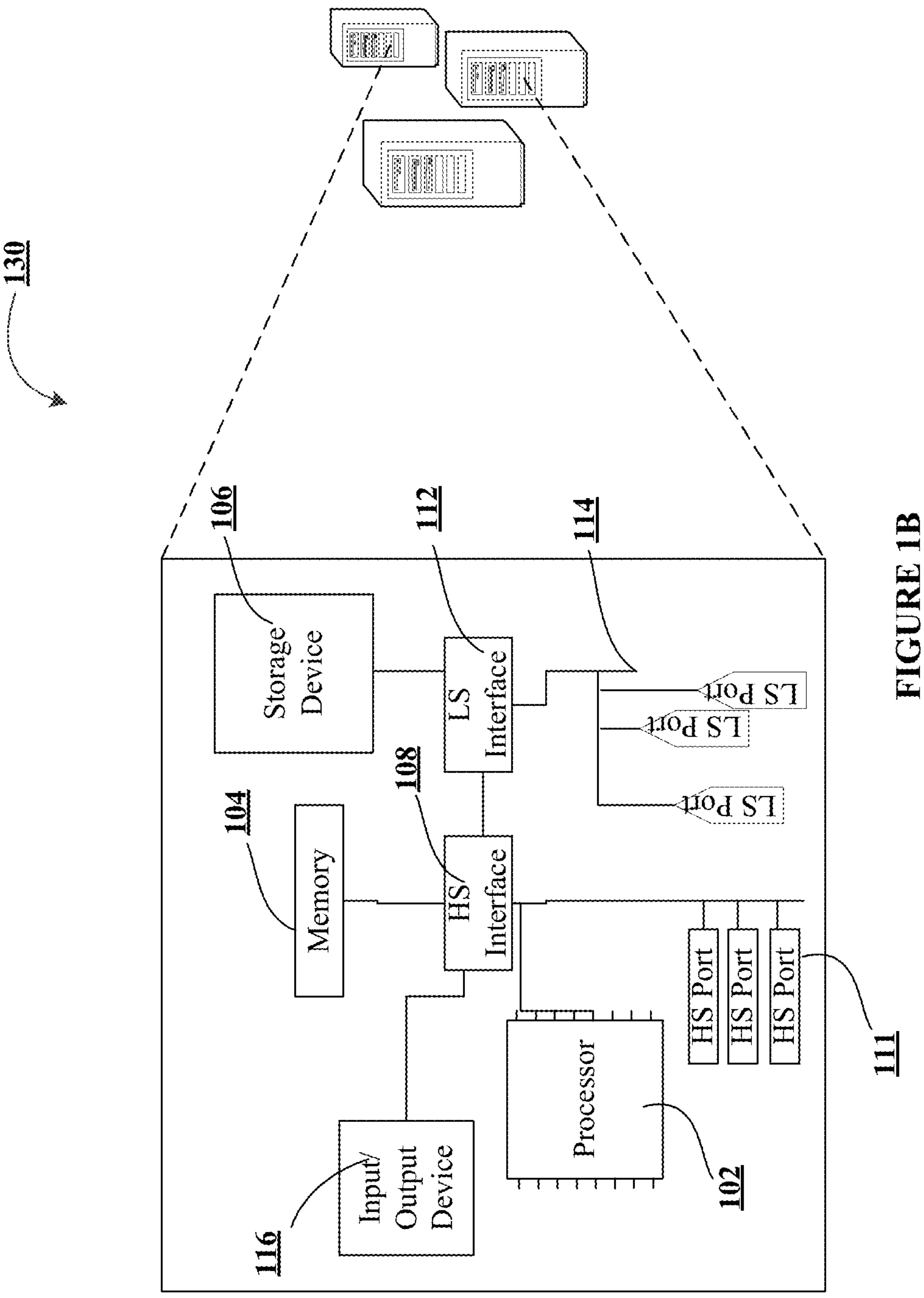
Figure 1C:
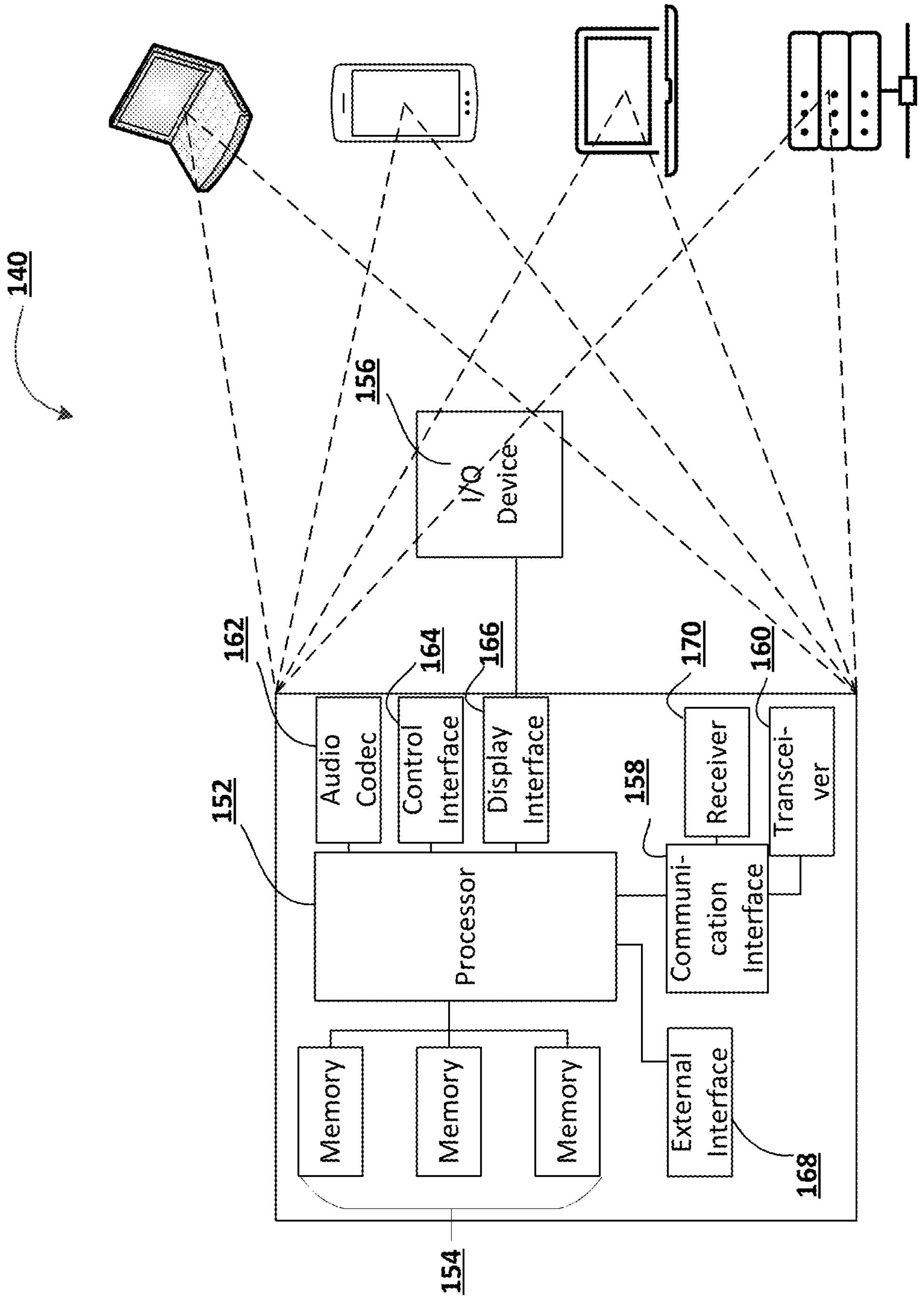
Figure 2:
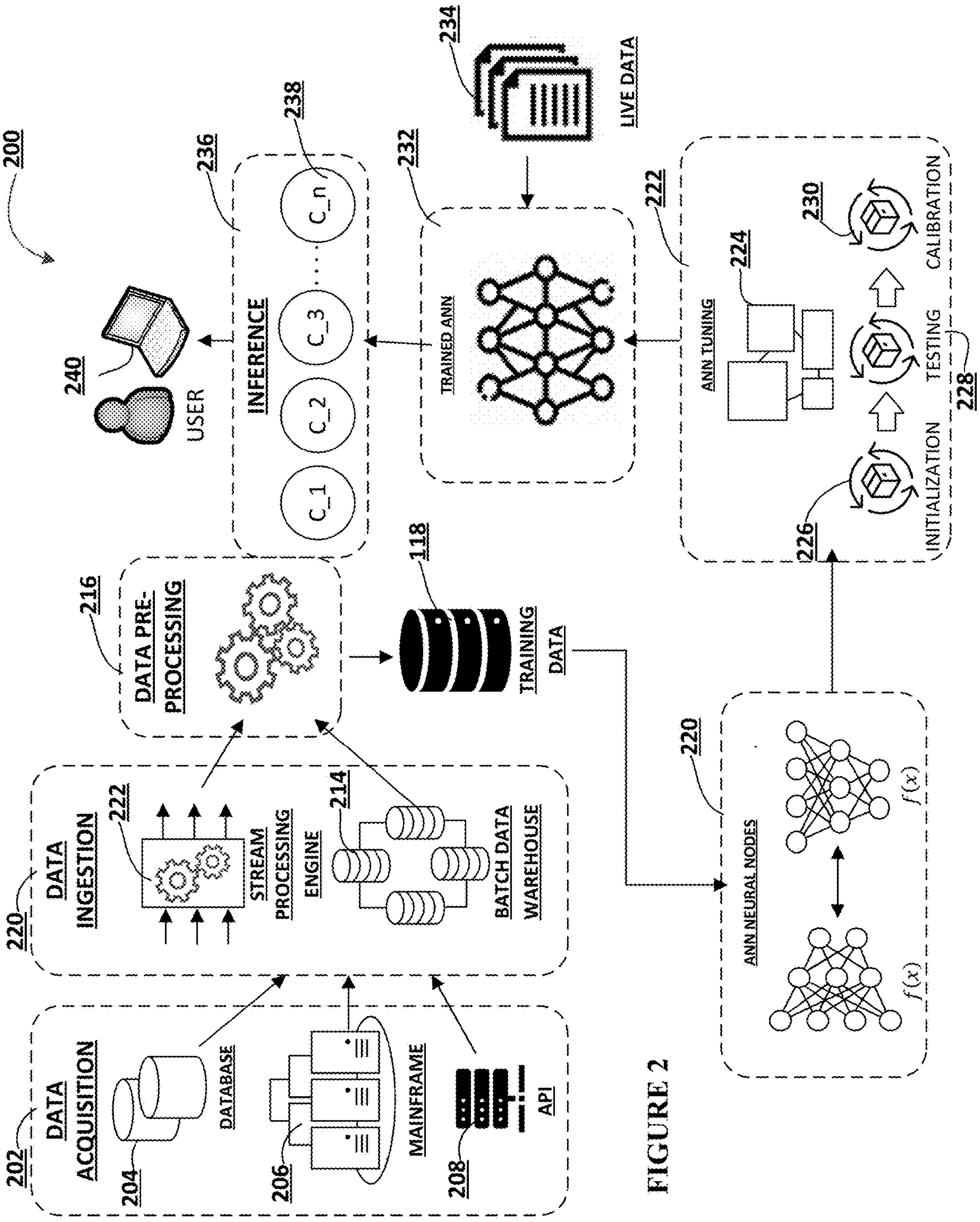
Figure 3:
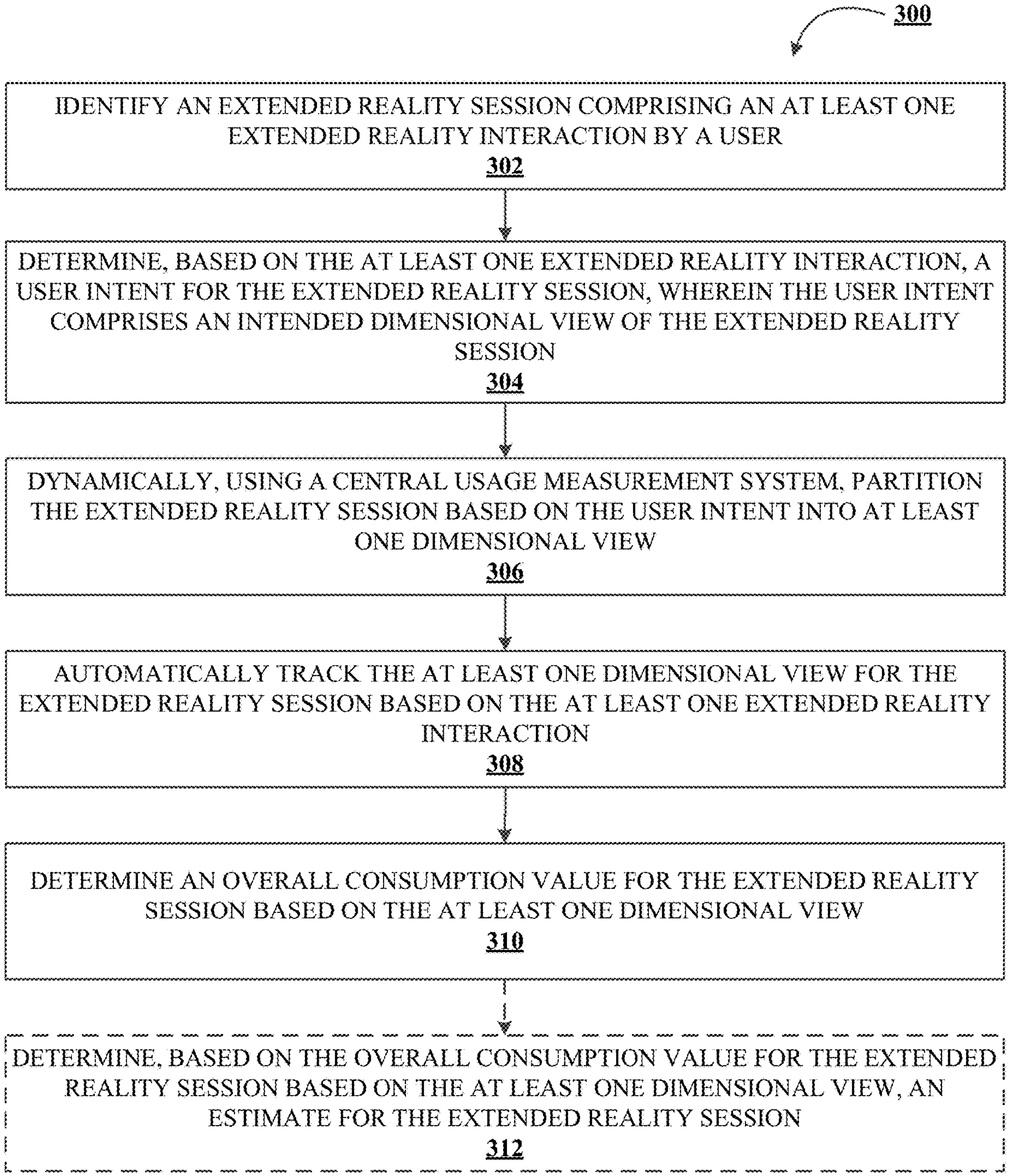
Figure 4:
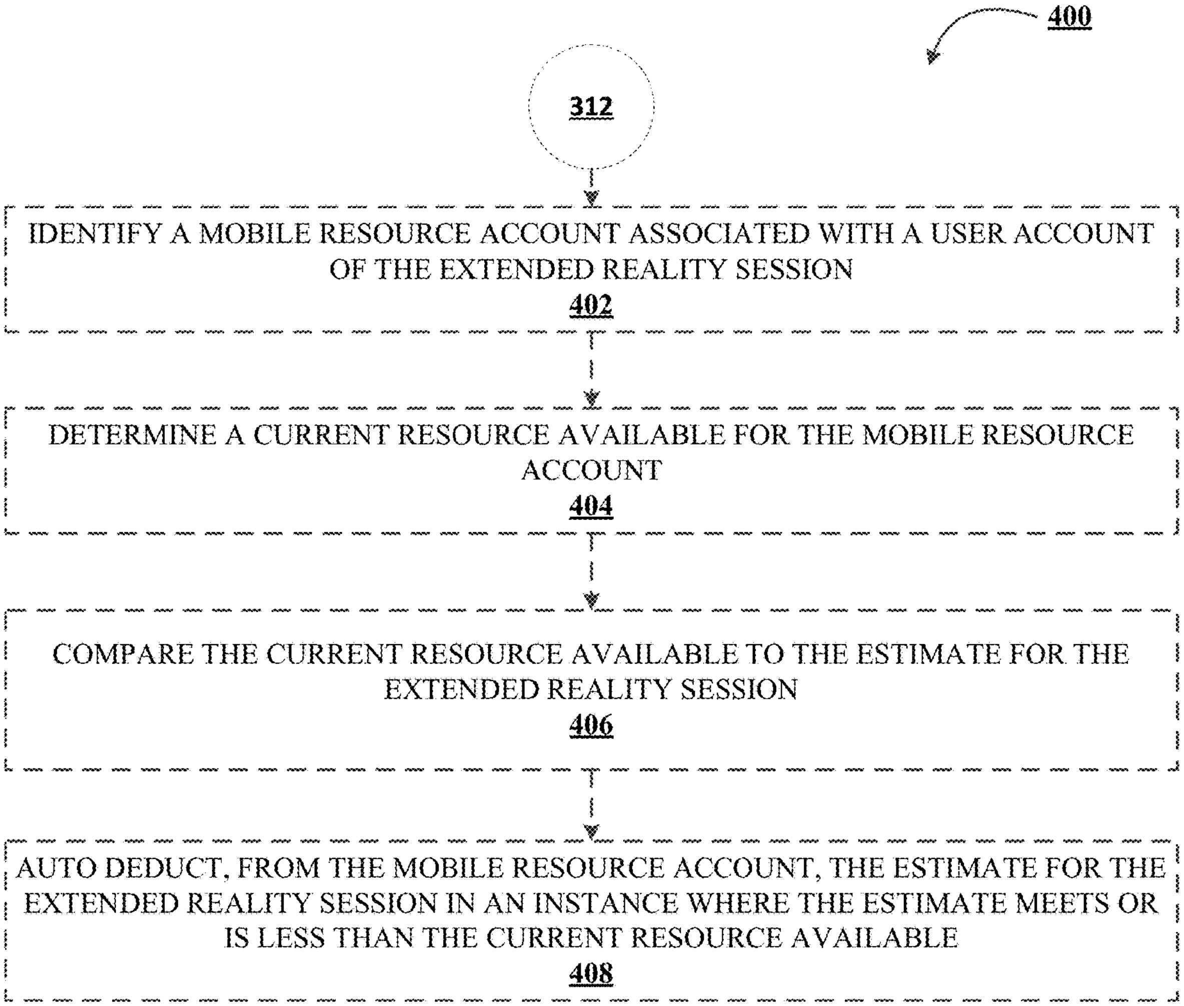
Figure 5:
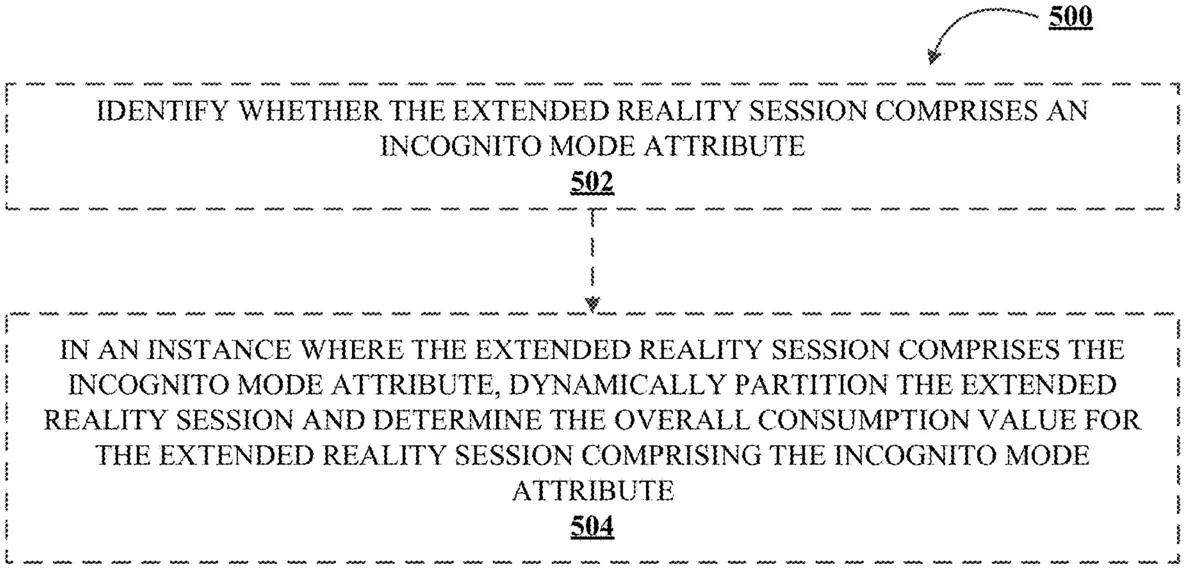
Figure 6:
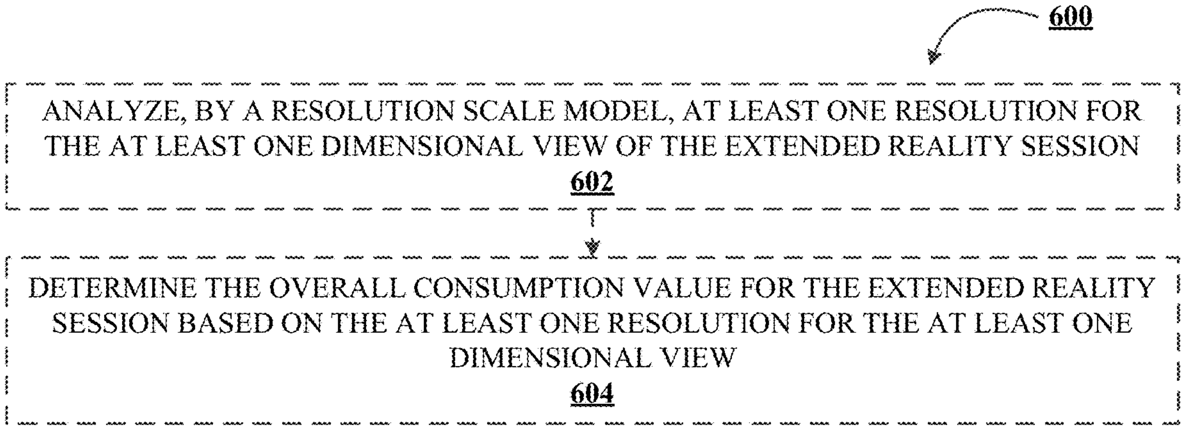
Figure 7:
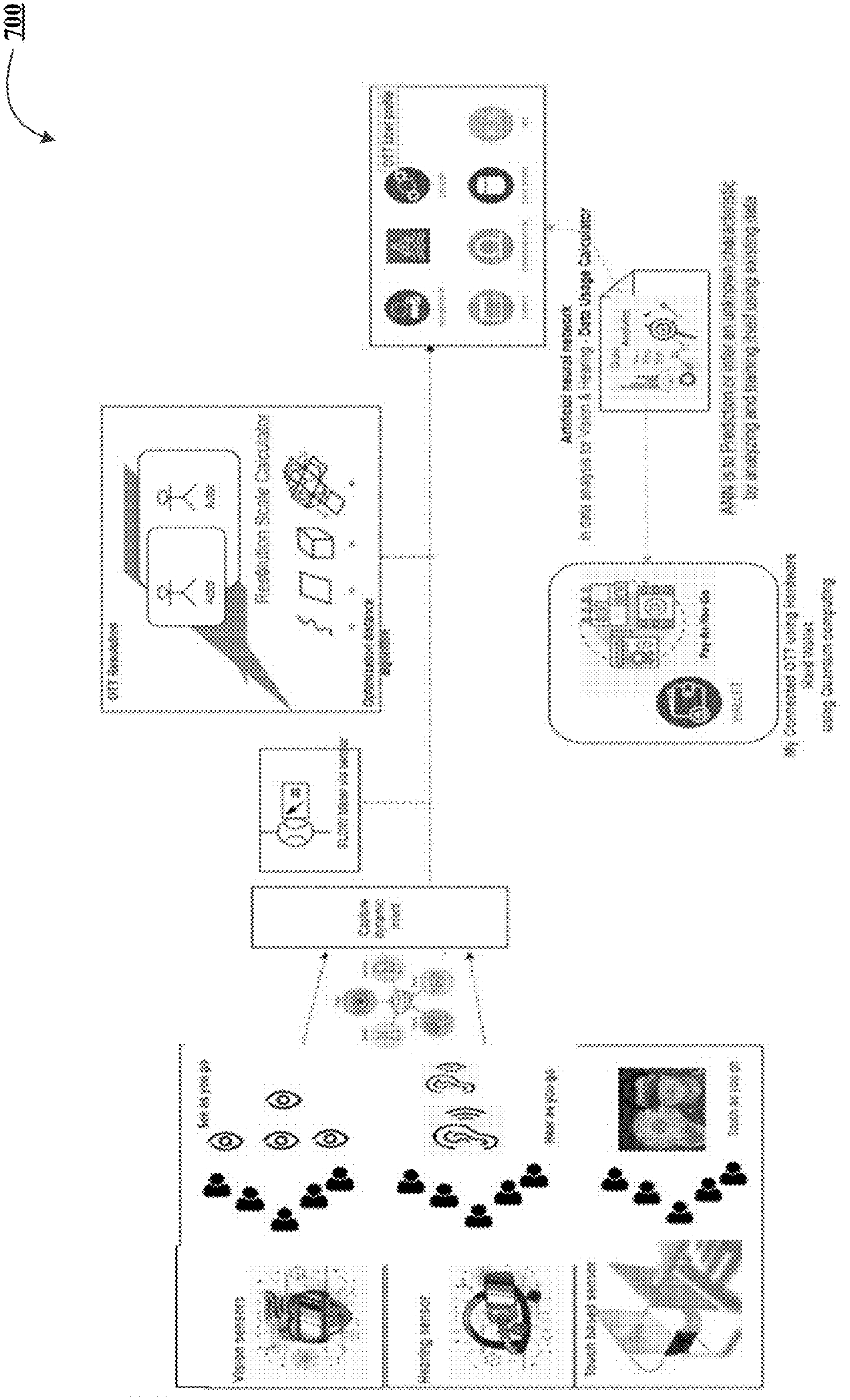

FIGS. 1A-1C illustrates technical components of an exemplary distributed computing environment for dynamically modifying extended reality environments and determining modified usages in real time using quantum computing, in accordance with an embodiment of the disclosure;

FIG. 2 illustrates an exemplary artificial neural network (ANN) subsystem architecture, in accordance with an embodiment of the disclosure;

FIG. 3 illustrates a process flow for dynamically modifying extended reality environments and determining modified usages in real time using quantum computing, in accordance with an embodiment of the disclosure;

FIG. 4 illustrates a process flow for auto deducting the estimate for the extended reality session, in accordance with an embodiment of the disclosure;

FIG. 5 illustrates a process flow for dynamically partitioning the extended reality session when a user is in incognito mode, in accordance with an embodiment of the disclosure;

FIG. 6 illustrates a process flow for determining the overall consumption value for the extended reality session based on the at resolution of the at least one dimensional view, in accordance with an embodiment of the disclosure; and FIG. 7 illustrates an exemplary architecture diagram for dynamically modifying extended reality environments and determining modified usages in real time using quantum computing, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Issues often arise in extended reality (XR) environments—such as an extended reality environment comprising artificial reality, virtual reality, mixed reality, and/or the like—in accurately partitioning each dimension within the extended reality environment and tracking user consumption. Such issues are further exacerbated in native devices where the virtual reality sessions are coupled with the native devices, making all the virtual reality experiences a mandate without an individual gate check. Thus, a system is needed that can accurately, efficiently, and securely partition dimensions within an extended reality session and can accurately, efficiently, securely, and dynamically track each dimension interaction.

Accordingly, the present disclosure provides for identifying an extended reality session comprising an at least one extended reality interaction by a user; determining, based on the at least one extended reality interaction, a user intent for the extended session, wherein the user intent comprises an intended dimensional view of the extended reality session; dynamically, using a central usage measurement system comprising a quantum computing component, partitioning the extended reality session based on the user intent into at least one dimensional view; automatically tracking the at least one dimensional view for the extended reality session based on the at least one extended reality interaction; and determining an overall consumption value for the extended reality session based on the at least one dimensional view.

Thus, in other words, the present disclosure provides for a dynamic rendering within an extended reality (XR) environment based on user interactions and real-time sensor readings of the user's interactions. Further, the invention provides for dynamically updating the XR environment based on the user's interactions (such as based on physical characteristics of the user as the user views/interacts with the XR environment). The system further provides for breaking down or splitting the different dimensions (e.g., just audio, just video, and/or the like) based on user interactions and measuring each of the split dimensions and the usage for each user.

What is more, the present disclosure provides a technical solution to a technical problem. As described herein, the technical problem includes modifying and tracking extended reality sessions and modified usages. The technical solution presented herein allows for the accurate and efficient tracking—in real time—the partitioned dimension(s) of an extended reality session based on user interactions, and the determination of overall consumption value for the extended reality session. In particular, the present disclosure is an improvement over existing solutions to the modifying and tracking extended reality sessions and modified usages, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamically modifying extended reality environments and determining modified usages in real time using quantum computing 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial neural network (ANN) subsystem architecture 200, in accordance with an embodiment of the disclosure. The ANN subsystem 200 may include a data acquisition engine 202, data ingestion engine 210, data pre-processing engine 216, ANN tuning engine 222, and inference engine 236.

The data acquisition engine 202 may identify various internal and/or external data sources to generate, test, and/or integrate new features for training the ANN 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day activities, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In ANN, the quality of data and the useful information that can be derived therefrom directly affects the ability of the ANN 224 to learn. The data pre-processing engine 216 may implement advanced integration and processing steps needed to prepare the data for ANN execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of ANN algorithm being used, this training data 218 may require further enrichment. For example, in supervised learning, the training data is enriched using one or more meaningful and informative labels to provide context so a ANN can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ANN tuning engine 222 may be used to train a ANN 224 using the training data 218 to make predictions or decisions without explicitly being programmed to do so. The ANN 224 represents what was learned by the selected ANN algorithm 220 and represents the rules, numbers, and any other algorithm-specific data structures required for classification. Selecting the right ANN algorithm may depend on a number of different factors, such as the problem statement and the kind of output needed, type and size of the data, the available computational time, number of features and observations in the data, and/or the like. ANN algorithms may refer to programs (math and logic) that are configured to self-adjust and perform better as they are exposed to more data. To this extent, ANN algorithms are capable of adjusting their own parameters, given feedback on previous performance in making prediction about a dataset.

The ANN algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable ANN model type. Each of these types of ANN algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an specific artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the ANN model, the ANN tuning engine 222 may repeatedly execute cycles of experimentation 226, testing 228, and tuning 230 to optimize the performance of the ANN algorithm 220 and refine the results in preparation for deployment of those results for consumption or decision making. To this end, the ANN tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained ANN 232 is one whose hyperparameters are tuned and model accuracy maximized.

The trained ANN 232, similar to any other software application output, can be persisted to storage, file, memory, or application, or looped back into the processing component to be reprocessed. More often, the trained ANN 232 is deployed into an existing production environment to make practical business decisions based on live data 234. To this end, the ANN subsystem 200 uses the inference engine 236 to make such decisions. The type of decision-making may depend upon the type of ANN algorithm used. For example, ANN models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, ANN models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, ANN models that perform regression techniques may use live data 234 to predict or forecast continuous outcomes.

It will be understood that the embodiment of the ANN subsystem 200 illustrated in FIG. 2 is exemplary and that other embodiments may vary. As another example, in some embodiments, the ANN subsystem 200 may include more, fewer, or different components.

FIG. 3 illustrates a process flow 300 for dynamically modifying extended reality environments and determining modified usages in real time using quantum computing, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. Additionally, and in some embodiments, an artificial neural network (ANN) (e.g., the system 200 described herein with respect to FIG. 2) may perform the steps of 300 in combination with the system 130.

As shown in block 302, the process flow 300 may include the step of identifying an extended reality session comprising an at least one extended reality interaction by a user. For example, and as used herein, extended reality refers to any technology that alters reality by adding digital elements such as through augmented reality (AR), virtual reality (VR), and/or mixed reality (MR). As used herein, an extended reality session may comprise a start time and an end time indicating a user's interactions during a period of time dedicated to interacting with the extended reality technology. Additionally, and in some embodiments, the extended reality session may comprise a plurality of intervals indicating a start time and an end time for each interval (e.g., an interval every ten seconds, every thirty seconds, every minute, and/or the like), which may be used to determine a plurality of extended reality sessions within an extended reality session comprising all of the interactions of the user with the extended reality technology in one sitting.

In some embodiments, and as used herein, the system may identify a start of an extended reality session based on receiving and/or identifying a new extended reality interaction by a user. In some such embodiments, the extended reality interaction may comprise a user placing a virtual reality headset on their head and submitting their authentication credentials. In some embodiments, the extended reality interaction may comprise a user interacting with and/or logging into an augmented reality device comprising two-dimensional (2D) or three-dimensional (3D) capabilities. In some embodiments, the system may identify the start of the extended reality session based on a period of non-interaction (e.g., a user may not be currently logged in using authentication credentials to the AR or VR device for an extended period of time, such as a few minutes, an hour, a day, and/or the like).

In some embodiments, the extended reality interactions may comprise movement by a user (such as physical movement comprising hand tracking in the extended reality environment which allows the user's hands to be used as an input method), eye movement or pupil dilation or constriction, vocal inputs by the user, and/or the like. Thus, and as used herein, the extended reality interactions may comprise user inputs based on the physical movements of the user and/or based on vocal indicators of the user (such as words spoken by the user, and other such vocal responses by the user).

As shown in block 304, the process flow 300 may include the step of determining—based on the at least one extended reality interaction—a user intent for the extended reality session, wherein the user intent comprises an intended dimensional view of the extended reality session. For example, the system may determine a user intent from the at least one extended reality interaction based on analyzing the extended realty interaction(s) to determine whether the user likes the current view of the extended reality session, would like a different view (e.g., a different dimensional view of the extended reality session, a different set of dimensional views of the extended reality session, and/or the like). By way of non-limiting example, the system may identify an extended reality interaction as the user's eyes constricting as they view the extended reality session, which may be used by the system to determine that the brightness of the extended reality session is too bright for the user and should be dimmed. Additionally, and by way of non-limiting example, the system may identify an extended reality interaction as a user submitting a vocal input directing the extended reality session to switch to audio only, and thus, the system may determine the intended dimensional view as an audio-only view (e.g., the interface of the extended reality session's user device may be appear blank and/or black while the audio is filtered in through the speakers of the user's device). In some embodiments, the audio-only view may comprise the audio of the original extended reality session, such that the extended reality session is not interrupted or delayed and instead only the audio remains from the original extended reality session. Additionally, and as understood by those of skill in the art, the examples provided herein are not intended to be limiting in any manner, but instead of intended to provide exemplary scenarios of how an extended reality interaction may be identified and used to determine an intended dimensional view.

Thus, and as used herein, the user intent comprises feedback from the user, which may further comprise indicators of whether the user likes the current view of the extended reality session, whether the user wants the extended reality session to be split into one or more dimensions (e.g., audio only, visual only such as images and/or videos, tactile only, smell only, taste only, and/or the like, and/or any such combination thereof). Additionally, and as understood herein, the intended dimensional view refers to a single and/or combination of sensory views for the user based on a determined intent from the extended reality interaction(s).

In some embodiments, the at least one dimensional view comprises at least one of a two-dimensional view, a three-dimensional view, a four-dimensional view, an auditory sound, an image, a video, or a tactile view, and/or a combination of any of these dimensional views. Thus, and as used herein, the at least one dimensional view may comprise a customized single or set of dimensional views which may be synchronized together (in an instance where a plurality of dimensional views are used) to generate one interactive extended reality session.

As shown in block 306, the process flow 300 may include the step of dynamically—using a central usage measurement system—partition the extended reality session based on the user intent into at least one dimensional view. For example, the system may comprise a central usage measurement system that is designed and configured to split the dimensions of the extended reality session in real time and dynamically based on the extended reality interaction(s) and the determined user intent for how the dimensional view(s) should be shown to the user (e.g., audio only, video only, images only, tactile only, smell only, taste only, and/or a combination of any of these dimensional views). Additionally, such a central usage measurement system may further be configured to, real-time, track each of the usages of each dimension in the dimensional view(s) used to create the custom extended reality session, such that the dimensional view(s) used to create the custom extended reality session are the only dimensions measured to determine usage (and in some embodiments, are used to determine the overall usage and/or cost of the determined usage). In some embodiments, the central measurement system may comprise at least one quantum computing component which is configured to partition or split the dimensions within the extended reality session based on the intended dimensional view(s) of the user. In some embodiments, and by using the at least one quantum computing component, the system is able to accurately and efficiently partition the dimensions of the extended reality session and also seamlessly integrate the dimension(s) to the user device such that there is no downtime and the dimensional view(s) (where multiple dimensional views are intended) are integrated into one interactive extended reality session for the user.

Additionally, and in some embodiments, the quantum computing component may need to access background data to properly generate the partitioned extended reality session, such as background data requested by the user based on the at least one extended reality interaction. By way of non-limiting example, a user may submit a vocal request via the extended reality interaction that wishes to see a particular movie produced at a current time (such as within the past year), but in a historical time period (such as in black and white movies which were popular until the mid-twentieth century). Thus, a quantum computing component may be tasked with accessing or receiving background data associated with black and white movies and other such mid-twentieth century movies and environments, to create background imagery and/or sounds for the extended reality session that is inline with the user's extended reality interactions and intentions for the dimensional view(s).

Additionally, and similar to the example provided above, an artificial neural network (ANN) may likewise be used with the central usage measurement system and/or the quantum computing component to fill in missing data and/or information to generate the partitioned extended reality session (e.g., background data of 1950s movies, living rooms, user preferences, and/or the like). In some embodiments, the ANN may be configured to access a user preference database associated with a user account and determine missing data or information of user preferences to generate the missing data for the partitioned extended reality session (such as data regarding the user's brightness preferences, user's loudness or volume preferences, and/or the like).

Thus, and as used herein, the partitioning of the extended reality session is based on the intended dimensional view of the user to generate at least one dimensional view (e.g., only audio, only visual/video/images, only smell, only tactile, and/or the like) and/or a combination of dimensional views (e.g., a video may be combined with audio). Additionally, such partitioning may occur by splitting multiple dimensions of the extended reality session to create a multi-dimensional view/session to create a multi-dimensional view (e.g., a video with audio presented to the user over a headset).

As shown in block 308, the process flow 300 may include the step of automatically tracking the at least one dimensional view for the extended reality session based on the at least one extended reality interaction. For example, the system may automatically track the partitioned extended reality session with the at least one dimensional view based on the at least one extended reality interaction, whereby the at least one extended reality interaction may be identified and/or received at a current time and used by the system to determine whether the user is still interacting with the extended reality session with the dimensional view(s) and/or whether the user wishes to change dimensional view(s). Thus, and based on the current and previous extended reality interactions with the user, the system may both update the dimensional view(s) (where the user is determined to want the dimensional view(s) to change) and track the current usage of the dimensional view(s) within the extended reality session.

Thus, and in other words, the system may track the at least one dimensional view in real-time as the user is interacting at pre-determined intervals (such as every ten seconds, every minute, and/or the like), and/or at the end of the overall extended reality session. Thus, and based on the at least one extended reality interaction by the user, the system may track—in real time—how the user is interacting with the extended reality session and whether the at least one dimensional view is still being used by the user and/or whether the at least one dimensional view should be transformed to a different dimensional view. Once the system has tracked the current usage of the dimensional view(s) of the user (e.g., over the overall extended reality session and/or at the current pre-determined interval), the system may determine an overall consumption value (e.g., over the overall extended reality session and/or for the current pre-determined interval).

In some embodiments, the automatic tracking of the at least one dimensional view comprises tracking the at least one dimensional view at a current time and at least one dimensional view at a future time within the extended reality session. In other words, the system may track all the dimensional views used by the user within the overall extended reality session and/or within each pre-determined interval of the extended reality session, such that there is a complete record of the dimensional views used by the user in the extended reality session.

As shown in block 310, the process flow 300 may include the step of determining an overall consumption value for the extended reality session based on the at least one dimensional view. For example, the overall consumption value may refer to the cost of the extended reality session based on the dimensional view(s) used within the extended reality session, which may comprise a cost (in power, watts, storage usage, overall consumption of computing resources, and/or the like) to run the extended reality session. In some embodiments, the overall consumption value is associated with a computing component consumption further comprising at least one of a power consumption, a memory storage consumption, or a computer processing unit usage. Thus, and based on the usage of computing systems required to generate the extended reality session and the individual dimensional view(s) within the extended reality session, the system may determine the overall consumption value for the overall extended reality session and/or the pre-determined interval(s) of the extended reality session.

Thus, and in some embodiments, the overall consumption value may be based on gathering data in real time or at pre-determined intervals of the extended reality session (e.g., every 10 seconds, every minute, every 10 minutes, and/or the like) and determining or calculating the computational cost of the at least one dimensional view generated within that interval. In some embodiments, and based on this overall consumption value, an estimate may be determined which is calculated based on the overall consumption value (such as based on a pre-determined ratio between the overall consumption value, based on pre-determined price estimates for each computing consumption type or factor, and/or the like) and such an estimate is used as a comparison to a virtual wallet or mobile resource account. Such an embodiment is disclosed in further detail below with respect to FIG. 4.

In some embodiments, and as shown in block 312, the process flow 300 may include the step of determining—based on the overall consumption value for the extended reality session based on the at least one dimensional view—an estimate for the extended reality session. For example, and in some embodiments, the system may determine an estimate based on the overall consumption value, whereby the estimate may comprise a price estimate for the user to pay for their usage of the dimensional view(s) within the extended reality session (e.g., overall and/or the current pre-determined interval). Thus, the estimate for the extended reality session may comprise a total estimate for the entire extended reality session and/or a proportionate estimate for the current interval of the extended reality session, which may be transmitted to the user and/or a user's mobile resource account to deduct the determined estimate from a resource account associated with the user. In this manner, the system may dynamically partition the extended reality session based on actual and intended usage of the user and may accurately and efficiently determine the overall consumption value for the actual usage of the partitioned extended reality session with the dimensional view(s) used by the user. Additionally, and in some embodiments, the estimate may be in a monetary format that is in a similar or same format as a resource account associated with the user (such as dollars and/or cents for United States-based users).

FIG. 4 illustrates a process flow 400 for auto deducting the estimate for the extended reality session, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. Additionally, and in some embodiments, an artificial neural network (ANN) (e.g., the system 200 described herein with respect to FIG. 2) may perform the steps of 400 in combination with the system 130.

In some embodiments, and as shown in block 402, the process flow 400 may include the step of identifying a mobile resource account associated with a user account of the extended reality session. For example, and in some embodiments, the system may identify a mobile resource account associated with a user account of the extended reality session based on identifying the user interacting with the extended reality session. In some embodiments, and where the user is requested to input their authentication credentials for a user account to use the extended reality session technology (e.g., VR headset, AR headset, MR headset, and/or the like, and/or other such extended reality user interface components), the system may identify a mobile resource account associated or linked with the user's user account. In some embodiments, such a mobile resource account may comprise a mobile wallet associated with the user, an over-the-top (OTT) wallet, electronic wallets, and/or the like. In some embodiments, the mobile resource account may comprise a particular resource account that the user has identified for payment for the system's determined estimates (e.g., that shown and described above with respect to FIG. 3).

In some embodiments, and as shown in block 404, the process flow 400 may include the step of determining a current resource available for the mobile resource account. For example, and in some embodiments, the system may determine the current resource available (such as the current credit of the mobile resource account, debit limit, electronic resource limit, and/or the like) which is currently available for use by the user interacting with the extended reality session. In other words, and as used herein, the current resource available may be within the mobile resource account and may be based on a current value of what the mobile resource account comprises, which may be based on a previously submitted resource from the user to the mobile resource account and/or previous instances where resource transmissions were transmitted from the mobile resource account to a recipient account (such as a recipient account associated with providing an extended reality session).

In some embodiments, and as shown in block 406, the process flow 400 may include the step of comparing the current resource available to the estimate for the extended reality session. For example, the estimate may be based on a portion of the extended reality session, the overall extended reality session, and/or the like, and the estimate may be applied and/or compared to the current resource available for the mobile resource account. As used herein, the term compare refers to a determination of whether the current resource available is greater than or equal to the estimate of the extended reality session.

In some embodiments, and where the current resource available is less than the estimate of the extended reality session, the system may kick out or terminate the extended reality session in real time. In some such embodiments, the system may further generate a notification interface component to transmit to the user device associated with the extended reality session to configure the interface of the user device to show a pop up notification indicating the reason for the termination of the extended reality session (e.g., the estimate has not been met or handled and an alternative resource account is needed to continue the extended reality session).

In some embodiments, and as shown in block 408, the process flow 400 may include the step of auto deducting—from the mobile resource account—the estimate for the extended reality session in an instance where the estimate meets or is less than the current resource available. For example, and as used herein, auto-deducting refers to an automatic subtraction, from the current resource available, of the value of the estimate at the same time or in near real time when the value of the estimate is transmitted from the mobile resource account to a recipient account (e.g., such as recipient account associated with the provider of the computing resources used to generate the extended reality session, partition the extended reality session, and/or generate the dimensional view(s) of the extended reality session). Thus, and in some embodiments, the transmission of the value of the estimate from the mobile resource account may comprise transmitting the value of the estimate to an identified recipient account associated with a provider of the extended reality session.

Additionally, and in some embodiments, the system may automatically and in real time update the current resource available based on the deducted value of the estimate to reflect the auto-deducted estimate value from the current resource available. Thus, and where the estimate is based on a current pre-defined interval, the user may continue to a future or later pre-defined interval in the same extended reality session, such that the user may pay for the dimensional view(s) in real time and as the user interacts with the partitioned extended reality session, rather than only at the end of the overall extended reality session.

FIG. 5 illustrates a process flow 500 for dynamically partitioning the extended reality session when a user is in incognito mode, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. Additionally, and in some embodiments, an artificial neural network (ANN) (e.g., the system 200 described herein with respect to FIG. 2) may perform the steps of 500 in combination with the system 130.

In some embodiments, and as shown in block 502, the process flow 500 may include the step of identifying whether the extended reality session comprises an incognito mode attribute. For example, the incognito mode attribute may be used by the system to determine whether the user is accessing websites, web browsers, and/or the like in a privacy mode meant to hide browsing history of the user, block browser cookies and site data, and/or the like. Further, and in some embodiments, the system may identify the existence of the incognito mode attribute based on identifying a lack of historical data within a web browser application, based on identifying the incognito mode attribute within a data trail associated with an internet service provider (ISP), and/or the like. Thus, the system may determine that a user has selected to access a web browser for the user of an extended reality session in incognito mode and the system may continue with the steps identified with respect to FIG. 3 (e.g., dynamically partition the extended reality session and determine the overall consumption value in a similar manner as that described above with respect to blocks 302-310 and/or 302-312).

In some embodiments, and as shown in block 504, the process flow 500 may include the step of dynamically partitioning—in an instance where the extended reality session comprising the incognito mode attribute—the extended reality session and determining the overall consumption value for the extended reality session comprising the incognito mode attribute. Similar to the explanation provided herein above with respect to FIG. 3, and despite the user being in incognito mode while interacting with an extended reality session, the system provided herein may still operate to determine a user intent for the extended reality session, dynamically partition the extended reality session, automatically track the at least one dimensional view, and determine an overall consumption value for the extended reality session.

FIG. 6 illustrates a process flow 600 for determining the overall consumption value for the extended reality session based on the at resolution of the at least one dimensional view, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 300. Additionally, and in some embodiments, an artificial neural network (ANN) (e.g., the system 200 described herein with respect to FIG. 2) may perform the steps of 600 in combination with the system 130.

In some embodiments, and as shown in block 602, the process flow 600 may include the step of analyzing—by a resolution scale model—at least one resolution for the at least one dimensional view of the extended reality session. For example, the system may analyze at least one resolution feature of the extended reality session and its at least one dimensional view to determine whether the resolution (such as the pixels of the dimensional view comprising images and/or videos, tactile view, and/or the like) should be increased or decreased in real-time. In some embodiments, the system may track extended reality interaction(s) of the user, such as pupil dilation which may indicate the user is happy with the current resolution and view of the dimensional view and may not increase the resolution. In some embodiments, and by way of non-limiting example, the system may determine the user's pupils have constricted which may indicate that the user is unhappy with the current resolution and may lead the system to increase the resolution of the dimensional view(s) automatically and dynamically and/or increase the size of the image the user is viewing in the extended reality session.

In some embodiments, the at least one resolution is pre-determined based on a user preference, and the user preference automatically retains the at least one resolution, increases the at least one resolution, or decreases the at least one resolution. For example, and in some embodiments, the system may keep a record of each of the user preferences regarding user memberships with extended reality environments, past preferences which may be stored on distributed ledgers for multiple extended reality environments, vision preferences, hearing or sound preferences, device identifier preferences, and/or the like. In some embodiments, and where the user preference record is missing information or data that the system currently needs to determine what the user would like to see (e.g., audio only dimensional view and associated volume), then the system may use a trained ANN model to update the user preferences for such missing data. Further, and once the system has generated the partitioned extended reality session, the system may collect the extended reality interactions by the user as feedback for the ANN model-provided missing data to further train the ANN model and further update the user preferences record.

In some embodiments, and as shown in block 604, the process flow 600 may include the step of determining the overall consumption value for the extended reality session based on the at least one resolution for the at least one dimensional view. For example, the system may dynamically increase or decrease the overall consumption value determined in FIG. 3 based on the resolution for the at least one dimensional view. For example, and where the resolution is increased, then the overall consumption value may be increased to follow the increasing of the resolution and its effect on the consumption of the computing resources in generating the increased resolution for the extended reality session.

FIG. 7 illustrates an exemplary architecture diagram 700 for dynamically modifying extended reality environments and determining modified usages in real time using quantum computing, in accordance with an embodiment of the disclosure. In some embodiments, a system (e.g., similar to one or more of the systems described herein with respect to FIGS. 1A-1C) may perform one or more of the steps within the architecture diagram 700. For example, a system (e.g., the system 130 described herein with respect to FIG. 1A-1C) may perform the steps within the architecture diagram 700. Additionally, and in some embodiments, an artificial neural network (ANN) (e.g., the system 200 described herein with respect to FIG. 2) may perform the steps within the architecture diagram 700 in combination with the system 130.

As shown in exemplary architecture diagram 700, the system described herein is shown to identify the extended reality interaction(s) of a user (e.g., using vision sensors, hearing sensors, touch-based sensor, and/or the like), which may be used by the system to determine the intent of the user (e.g., by capturing the dynamic intent of the user). Additionally, and in some embodiments and as shown in architecture diagram 700, the system may use a resolution scale calculator to determine the resolution of each of at least one dimensional view for the user within the extended reality session, which may be additionally based on a user preference record or database. In some such embodiments, the user preference record may be updated by an artificial neural network (ANN) configured to determine missing data of the user preferences, such as vision and hearing for the user. Additionally, the system may further identify a mobile resource account of the user, such as an OTT using a hardware hard wallet using quantum computing to compare against the estimate of the overall consumption value for the user's interactions within the extended reality session.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamically modifying extended reality environments and determining modified usages in real time using quantum computing, the system comprising:

a processing device;

a non-transitory storage device containing instructions when executed by the processing device, causes the processing device to perform the steps of:

identify an extended reality session comprising an at least one extended reality interaction by a user;

determine, based on the at least one extended reality interaction, a user intent for the extended reality session, wherein the user intent comprises an intended dimensional view of the extended reality session;

dynamically, using a central usage measurement system comprising a quantum computing component, partition the extended reality session based on the user intent into at least one dimensional view comprising one or more dimensions, wherein the partition of the extended reality session comprises splitting the extended reality session to the one or more dimensions, wherein the one or more dimensions comprise at least one of an audio-only dimension, a video-only dimension, an image-only dimension, or a tactile-only dimension, and wherein the splitting separates the extended reality session into the at least one of the audio-only dimension, the video-only dimension, the image-only dimension, or the tactile-only dimension based on the user intent;

integrate, using the quantum computing component, the extended reality session with the one or more dimensions in real time, wherein the integration comprises a seamless integration between the one or more dimensions in the extended reality session, wherein the quantum computing component accesses background data to generate the partitioned extended reality session, and wherein the seamless integration by the quantum computing component synchronizes the one or more dimensions together to generate one interactive extended reality session without down-time;

automatically track the at least one dimensional view for the extended reality session based on the at least one extended reality interaction;

determine, in real time or near real time to an end of the extended reality session, an overall consumption value for the extended reality session based on the at least one dimensional view used during the extended reality session and a computing consumption over a span of time of the extended reality session; and determine, based on the overall consumption value, an estimate over the span of time of the extended reality session.

2. The system of claim 1, wherein the automatic tracking of the at least one dimensional view comprises tracking the at least one dimensional view at a current time and at least one dimensional view at a future time within the extended reality session.

3. The system of claim 1, wherein executing the instructions when executed by the process device, causes the at least one processing device to:

identify a mobile resource account associated with a user account of the extended reality session;

determine a current resource available for the mobile resource account;

compare the current resource available to the estimate for the extended realty session; and auto deduct, from the mobile resource account, the estimate for the extended reality session in an instance where the estimate meets or is less than the current resource available.

4. The system of claim 1, wherein the overall consumption value is associated with a computing component consumption further comprising at least one of a power consumption, a memory storage consumption, or a computer processing unit usage.

5. The system of claim 1, wherein the at least one dimensional view comprises at least one of a two-dimensional view, a three-dimensional view, a four-dimensional view, an auditory sound, an image, a video, or a tactile view.

6. The system of claim 1, wherein executing the instructions when executed by the process device, causes the at least one processing device to:

identify whether the extended reality session comprises an incognito mode attribute; and in an instance where the extended reality session comprises the incognito mode attribute, dynamically partition the extended reality session and determine the overall consumption value for the extended reality session comprising the incognito mode attribute.

7. The system of claim 1, wherein executing the instructions when executed by the process device, causes the at least one processing device to:

analyze, by a resolution scale model, at least one resolution for the at least one dimensional view of the extended reality session; and determine the overall consumption value for the extended reality session based on the at least one resolution for the at least one dimensional view.

8. The system of claim 7, wherein the at least one resolution is pre-determined based on a user preference, and wherein the user preference automatically retains the at least one resolution, increases the at least one resolution, or decreases the at least one resolution.

9. The system of claim 8, wherein the user preference is dynamically updated based on a trained artificial neural network (ANN) model, and wherein the user preference updated by the ANN model is missing or unknown.

10. The system of claim 1, wherein the overall consumption value is based only on each dimensional view selected in the extended reality session.

11. The system of claim 1, wherein executing the instructions when executed by the process device, causes the at least one processing device to:

generate, by an artificial neural network (ANN), missing data for the extended reality session based on one or more user preferences of the user.

12. The system of claim 11, wherein the missing data comprises at least one of a preferred background for the at least one dimensional view, a lighting preference for the at least one dimensional view, or a speaker volume for the extended reality session.

13. A computer program product for dynamically modifying extended reality environments and determining modified usages in real time using quantum computing, the computer program product comprising a non-transitory computer-readable medium comprising code causing an apparatus to:

identify an extended reality session comprising an at least one extended reality interaction by a user;

determine, based on the at least one extended reality interaction, a user intent for the extended reality session, wherein the user intent comprises an intended dimensional view of the extended reality session;

dynamically, using a central usage measurement system comprising a quantum computing component, partition the extended reality session based on the user intent into at least one dimensional view comprising one or more dimensions, wherein the partition of the extended reality session comprises splitting the extended reality session to the one or more dimensions, wherein the one or more dimensions comprise at least one of an audio-only dimension, a video-only dimension, an image-only dimension, or a tactile-only dimension, and wherein the splitting separates the extended reality session into the at least one of the audio-only dimension, the video-only dimension, the image-only dimension, or the tactile-only dimension based on the user intent;

integrate, using the quantum computing component, the extended reality session with the one or more dimensions in real time, wherein the integration comprises a seamless integration between the one or more dimensions in the extended reality session, wherein the quantum computing component accesses background data to generate the partitioned extended reality session, and wherein the seamless integration by the quantum computing component synchronizes the one or more dimensions together to generate one interactive extended reality session without down-time;

automatically track the at least one dimensional view for the extended reality session based on the at least one extended reality interaction;

determine, in real time or near real time to an end of the extended reality session, an overall consumption value for the extended reality session based on the at least one dimensional view used during the extended reality session and a computing consumption over a span of time of the extended reality session; and determine, based on the overall consumption value, an estimate over the span of time of the extended reality session.

14. The computer program product of claim 13, wherein the automatic tracking of the at least one dimensional view comprises tracking the at least one dimensional view at a current time and at least one dimensional view at a future time within the extended reality session.

15. The computer program product of claim 13, wherein the overall consumption value is associated with a computing component consumption further comprising at least one of a power consumption, a memory storage consumption, or a computer processing unit usage.

16. The computer program product of claim 13, wherein the at least one dimensional view comprises at least one of a two-dimensional view, a three-dimensional view, a four-dimensional view, an auditory sound, an image, a video, or a tactile view.

17. A computer-implemented method for dynamically modifying extended reality environments and determining modified usages in real time using quantum computing, the computer-implemented method comprising:

identifying an extended reality session comprising an at least one extended reality interaction by a user;

determining, based on the at least one extended reality interaction, a user intent for the extended reality session, wherein the user intent comprises an intended dimensional view of the extended reality session;

dynamically, using a central usage measurement system comprising a quantum computing component, partitioning the extended reality session based on the user intent into at least one dimensional view comprising one or more dimensions, wherein the partition of the extended reality session comprises splitting the extended reality session to the one or more dimensions, wherein the one or more dimensions comprise at least one of an audio-only dimension, a video-only dimension, an image-only dimension, or a tactile-only dimension, and wherein the splitting separates the extended reality session into the at least one of the audio-only dimension, the video-only dimension, the image-only dimension, or the tactile-only dimension based on the user intent;

integrate, using the quantum computing component, the extended reality session with the one or more dimensions in real time, wherein the integration comprises a seamless integration between the one or more dimensions in the extended reality session, wherein the quantum computing component accesses background data to generate the partitioned extended reality session, and wherein the seamless integration by the quantum computing component synchronizes the one or more dimensions together to generate one interactive extended reality session without down-time;

automatically tracking the at least one dimensional view for the extended reality session based on the at least one extended reality interaction;

determining, in real time or near real time to an end of the extended reality session, an overall consumption value for the extended reality session based on the at least one dimensional view used during the extended reality session and a computing consumption over a span of time of the extended reality session; and determine, based on the overall consumption value, an estimate over the span of time of the extended reality session.

18. The computer-implemented method of claim 17, wherein the automatic tracking of the at least one dimensional view comprises tracking the at least one dimensional view at a current time and at least one dimensional view at a future time within the extended reality session.

19. The computer-implemented method of claim 17, wherein the overall consumption value is associated with a computing component consumption further comprising at least one of a power consumption, a memory storage consumption, or a computer processing unit usage.

20. The computer-implemented method of claim 17, wherein the at least one dimensional view comprises at least one of a two-dimensional view, a three-dimensional view, a four-dimensional view, an auditory sound, an image, a video, or a tactile view.

* * * * *